United States Patent
Ernest et al.

(10) Patent No.: US 7,276,833 B2
(45) Date of Patent: Oct. 2, 2007

(54) ELECTROMAGNETIC RETARDER SYSTEM AND METHOD

(75) Inventors: Steven N. Ernest, Windsor, CT (US); Bai Hua, Milpitas, CA (US); John Lester, West Hartford, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 10/994,638

(22) Filed: Nov. 23, 2004

(65) Prior Publication Data

US 2005/0127766 A1    Jun. 16, 2005

Related U.S. Application Data

(60) Provisional application No. 60/524,028, filed on Nov. 24, 2003.

(51) Int. Cl.
*H02K 1/22* (2006.01)
(52) U.S. Cl. ............................ 310/263; 310/76; 310/93
(58) Field of Classification Search ............ 310/76–78, 310/92–95, 263
See application file for complete search history.

(56) References Cited

U.S. PATENT DOCUMENTS

| | | | | |
|---|---|---|---|---|
| 3,553,507 A | * | 1/1971 | Bessiere | 310/93 |
| 6,543,588 B1 | * | 4/2003 | Raad | 188/267 |
| 6,700,265 B1 | * | 3/2004 | Bouissou | 310/105 |
| 6,700,354 B2 | * | 3/2004 | Okuno et al. | 322/29 |
| 2004/0262105 A1 | * | 12/2004 | Li et al. | 188/267 |

* cited by examiner

*Primary Examiner*—Thanh Lam
(74) *Attorney, Agent, or Firm*—David R. Yohannan; Kelley Drye & Warren LLP

(57) ABSTRACT

An electromagnetic retarder system is disclosed. In one embodiment, the retarder system comprises: a shaft; a coil statically disposed on the shaft and having a hollow cylindrical shape; a yoke statically disposed on the shaft, the yoke having a first cylindrical surface and a second cylindrical surface, the second cylindrical surface disposed coaxial with said coil; at least one claw pole rotor mounted on the shaft, the at least one claw pole rotor formed of magnetic half wheels that taper into claws; and an induction drum disposed coaxial with the shaft and mounted so as to encompass the coil, the yoke and the at least one rotor.

9 Claims, 5 Drawing Sheets

ELECTROMAGNETIC RETARDER SYSTEM AND METHOD

CROSS-REFERENCE TO RELATED APPLICATION

This application claims priority on U.S. Provisional Patent Application Ser. No. 60/524,028, for Electromagnetic Retarder System and Method, filed on Nov. 24, 2003, the entirety of which is incorporated herein by reference.

FIELD OF THE INVENTION

The present invention is directed generally to a system and method for slowing a vehicle. In particular, the present invention relates to an electromagnetic retarder system and method that utilizes eddy currents in order to assist in vehicle braking

BACKGROUND OF THE INVENTION

It is well known in the art to supplement a friction braking system of a motor vehicle with a retarding system, thereby extending the useful life of the friction braking system. Larger motor vehicles often utilize retarders as a device to decrease the velocity of the vehicle without having to apply the friction brakes each time the vehicle slows.

There are several types of retarders that may be used to slow large motor vehicles, including retarders that restrict the flow of engine exhaust; those that modify the timing of one or more engine valves; and those that use the interaction between magnetic or electromagnetic forces. Each type of retarder functions to decrease the kinetic energy created by and contained in a moving motor vehicle. For the remainder of this document, unless specified otherwise, the term "retarder" will refer to a magnetic or electromagnetic type of retarder.

Magnetic and electromagnetic retarders typically include a shaft and a rotor that rotate together in a magnetic field. Retarding force is generated at the rotor by interactions between eddy currents created in the rotor and the magnetic field. Such systems are commonly called "eddy current retarders." The retarding force created in the rotor is in the form of a drag torque that opposes the motion of a turning shaft or driveline.

The basic principles of electromagnetic retarders are well known. Generally, there are two types of electromagnetic retarders, those that use eddy currents to retard motion and those that use magnetic resistance. Eddy current retarders typically create a magnetic field and then pass a metallic component through the field. As the magnetic component passes through the field, free electrons in the metal move in circles as if caught in a whirlpool, called eddy currents. The eddy currents oppose the change that caused them (a reaction known as "Lenz's Law"), and therefore induced eddy currents will produce a retarding force when a metal component enters or leaves a magnetic field.

The rotational energy absorbed by the eddy currents in the rotor is converted to heat. Thus, cooling fins are typically added to the rotor to dissipate heat created by the eddy currents. Due to the large amount of heat created, adequate removal of heat from the system is required in order to prevent braking performance from deteriorating. This cooling process may be accomplished by air or fluid cooling. However, eddy currents are generally created in a rotating rotor or brake drum, and many difficulties result in sealing a rotating rotor or drum if fluid cooling is desired.

Electromagnetic eddy current retarders are well known in the art. For example, U.S. Pat. No. 6,176,355 (Jan. 23, 2001) to Yamamoto and assigned to Isuzu Motors Limited discloses an eddy current braking system for a vehicle. Generally, such eddy current electromagnetic retarders create the required eddy currents by either rotating a drum through a magnetic flux field or rotating a coil to generate a rotating flux field. The '355 patent, for example, uses eddy currents generated in a brake drum as the brake drum rotates through a magnetic flux field. U.S. Pat. No. 6,578,681 (Jun. 17, 2003) to Raad and assigned to Pacific Scientific Electrokinetics Division discloses an electromagnetic retarder in which the field windings that form the coil are mounted on and rotate with, the drive shaft.

Electromagnetic eddy current retarders typically include a stator that utilizes an electromagnet to generate a magnetic flux field. Stators are usually stationary while a rotatable rotor is connected to a torque delivery element, such as an axle or a driveline in a motor vehicle. The stator in electromagnetic eddy current retarders typically has coils composed of electromagnetic windings that may be excited with current supplied by a battery or an alternator system. Passing an electrical current through the coils creates a magnetic flux field. As the rotors pass through this field, a drag torque may be generated, thereby providing the desired retarding force.

Several difficulties may arise in the aforementioned retarder systems. Presently, eddy current retarders utilize what are typically known as brushes. Generally, brushes are the sliding connections that complete a circuit between a fixed and moving conductor. Due to their nature, brushes are often the source of failure of such systems.

In addition, eddy current retarders typically generate large amounts of rotational inertia. In retarder systems in which the majority of the system is rotating (the shaft, rotors and/or drum), this large amount of inertia works against the retarding force of the system itself and can reduce the effectiveness of the system.

In view of the foregoing, there is a need for an electromagnetic eddy current retarder that provides adequate retarding forces while effectively dissipating generated heat, eliminates the use of brushes, and reduces the rotational inertia of the system.

In at least some embodiments, the system and method of the present invention may provide advantages over known retarder systems. Some, but not necessarily all, embodiments of the present invention may utilize a fluid-cooled stationary drum and stationary coil. The stationary characteristic of these elements may reduce the difficulties commonly associated with fluid cooling. Some, but not necessarily all, embodiments of the present invention may eliminate the use of brushes by utilizing a stationary power source and a stationary coil, thereby increasing the reliability of the system. It is an additional advantage of some embodiments of the present invention to provide a retarder system wherein the only rotating element is that of a claw pole rotor, thereby decreasing the rotational inertia of the system. Additional advantages of various embodiments of the invention are set forth, in part, in the description that follows and, in part, will be apparent to one of ordinary skill in the art from the description and/or from the practice of the invention.

SUMMARY OF THE INVENTION

Responsive to the foregoing challenges, Applicant has developed an innovative electromagnetic retarder system generally comprising a power source, a controller and an electromagnetic retarder. The power source may comprise, without limitation, an alternator, a starter/alternator, or a battery. The controller is used to control the amount of current from the power source that is provided to the electromagnetic retarder. The electromagnetic retarder may comprise a shaft, a hollow cylindrical coil mounted on the shaft and stationary relative to the shaft, a yoke with two cylindrical surfaces, the smaller of which is disposed inside and coaxial with the coil mounted on the shaft and stationary relative to the shaft, at least one claw-pole rotor formed of magnetic half-wheels that taper into points or claws that is mounted on and rotates with the shaft, and a stationary hollow cylindrical induction drum that is coaxial with the shaft and mounted such that it encompasses the coil, yoke, and rotors.

It is to be understood that both the foregoing general description and the following detailed description are exemplary and explanatory only, and are not restrictive of the invention as claimed. The accompanying drawings, which are incorporated herein by reference, and which constitute a part of the specification, illustrate certain embodiments of the invention and, together with the detailed description, serve to explain the principles of the present invention.

BRIEF DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF A PREFERRED EMBODIMENT

Figure 1:
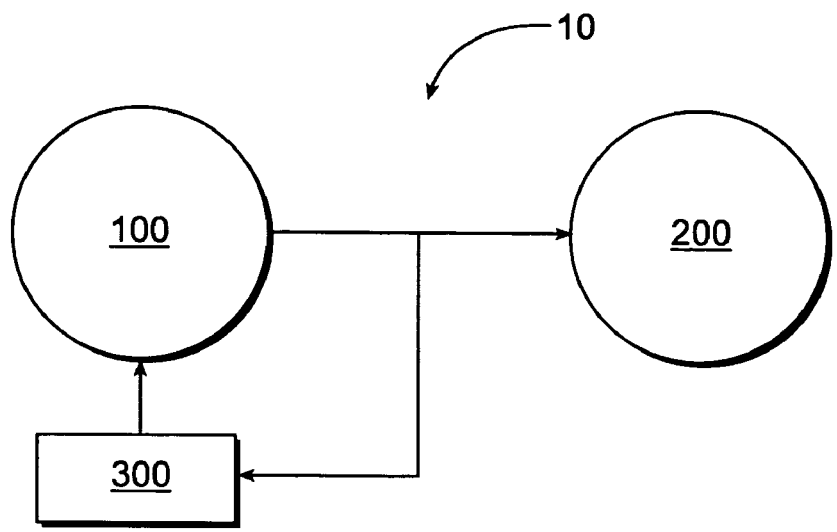
FIG. 1 is a block diagram of a retarder system according to a first embodiment of the present invention.

Reference will now be made in detail to embodiments of the system and method of the present invention, examples of which are illustrated in the accompanying drawings. A first embodiment of the present invention is shown in FIG. 1 as a retarder system 10. The retarder system 10 includes a power source 100, a claw pole electromagnetic retarder 200, and a controller 300 for controlling the power output from the power source 100 to the retarder 200.

Figure 2:
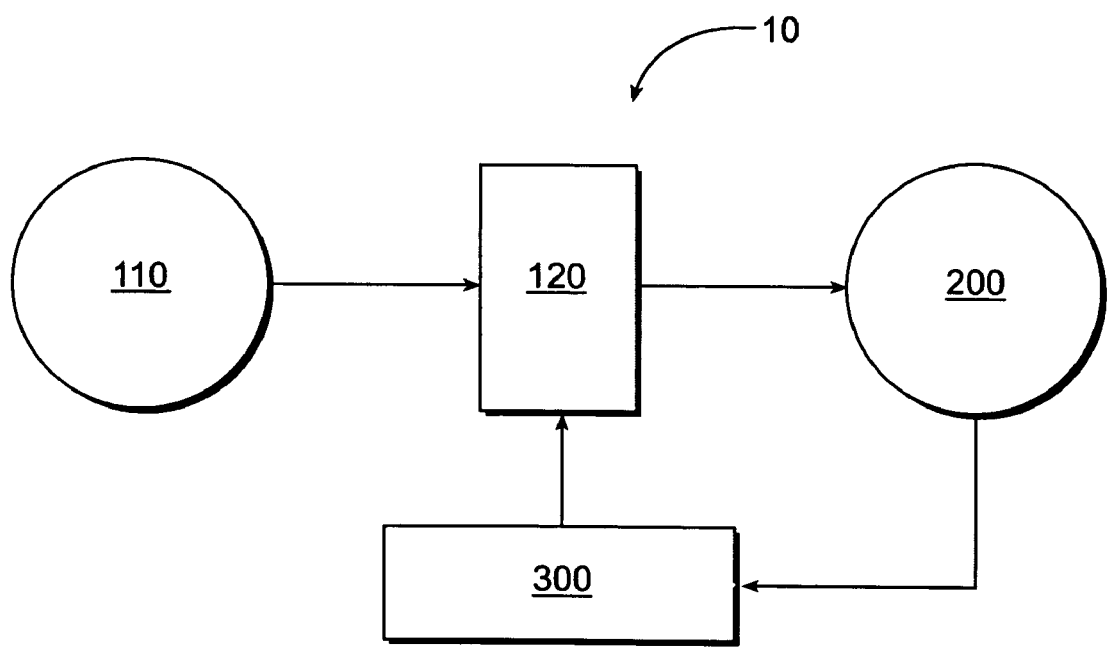
FIG. 2 is a block diagram of a retarder system according to a second embodiment of the present invention.

In a second embodiment, as shown in FIG. 2, the power source 100 may comprise an alternator 110 and a rectifier 120. The alternator 110 is adapted to generate an alternating current (AC), such as, for example, a three-phase AC current. The alternator 110 may be electrically connected to the rectifier 120 such that the current output from the alternator 110 is input into the rectifier 120. The rectifier 120 is adapted to convert the alternating current from the alternator 110 into a direct current (DC). It is appreciated that the alternator 110 may be used in conjunction with the vehicle battery (not shown) or may be a separate unit. In alternative embodiments, it is contemplated that the power source 100 may comprise a vehicle starter, an alternator, a starter/alternator, and/or other means for generating an electrical output to the retarder 200.

With continued reference to FIG. 2, the DC output from the rectifier 120 is controlled by the controller 300. The controller 300 may comprise a digital signal processor (DSP) or other device adapted to adjust the output power of the rectifier 120 to the retarder 200. The controller 300 may include a microprocessor or similar device linked to other engine component(s) to determine the required power. In this manner, the controller 300 may control the amount of retarding force applied to the vehicle based upon information collected by the microprocessor from the engine component(s). The information may include, without limitation, engine speed, vehicle speed, coolant temperature, and/or braking force applied by the operator. The controller 300 may activate and/or deactivate the retarder 200 by turning on or off the switches of the rectifier 120.

Figure 3:
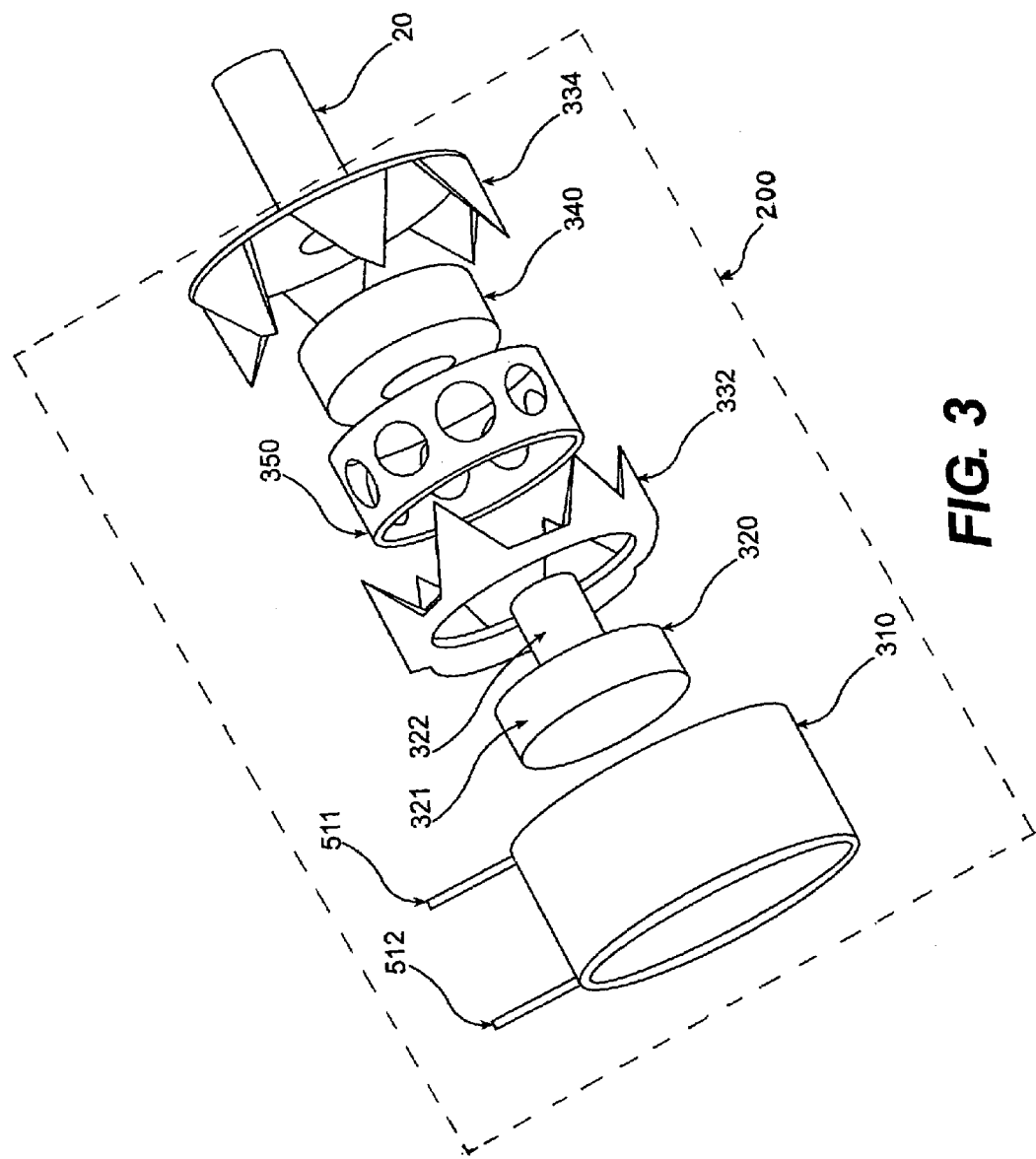
FIG. 3 is an exploded isometric view of a claw pole electromagnetic retarder according to an embodiment of the present invention.

As shown in FIG. 3, the retarder 200 is coupled to a drive shaft 20 of the vehicle. The retarder 200 may comprise a yoke 320, a coil 340, claw pole rotors 332 and 334, and an induction drum 310. The yoke 320 is statically mounted on the shaft 20 and may include a first cylindrical surface 321 and a second cylindrical surface 322. The second cylindrical surface 322 may comprise a smaller diameter than the first cylindrical surface 321 and may be disposed in an inner diameter of, and coaxially with, the coil 340. The coil 340 is stationary relative to the shaft 20. The coil 340 is comprised of a hollow cylindrical shape with an inner diameter and an outer diameter. The inner diameter of the coil 340 contacts the second cylindrical surface 322 of the yoke 320. The first cylindrical surface 321 of the yoke 320 is coaxial with the claw rotor 332.

The claw rotor 332 is mounted such that it rotates with the shaft 20. The claw rotor 332 may comprise a magnet half wheel that is tapered into points, or claws. The claw rotor 332 is disposed a slight distance radially from the first cylindrical surface 321 of the yoke 320. Additionally, the claw rotor's 332 claws may extend axially over the coil 340 and the second cylindrical surface 322 of the yoke 320.

The claw rotor 334 is mounted such that it rotates with the shaft 20. The claw rotor 332 may comprise a magnet half wheel that is also tapered into points, or claws. The claw rotors 332 and 334 are disposed such that their respective tips or claws extend into the interstices of the opposing claw.

The induction drum 310 may comprise a hollow cylindrical shaped drum mounted co-axially over the claw rotors 332 and 334. The induction drum 310 is stationary relative to the shaft 20 and may be fluid cooled. The inner diameter of the induction drum 310 is mounted a distance, radially, from the outer surface of the claw rotors 332 and 334.

The electromagnetic retarder 200 may further comprise a magnetically non-conductive holder 350 disposed intermediate of the coil 340 and the claw pole rotors 332 and 334. The holder 350 rigidly connects the claw pole rotor 332 with the claw pole rotor 334 such that the rotors rotate together. The holder 350 may prevent generated flux from passing directly from the north claw pole rotor 332 to the south claw pole rotor 334.

With reference to FIGS. 2 and 3, operation of one embodiment of the present invention will now be described. The alternator 110 produces a three-phase alternating current (AC) by means generally known in the art. The AC current produced by the alternator 110 is fed as input to the rectifier 120. The rectifier 120 converts the AC to a direct current (DC) and outputs the DC. The amount of the output of the rectifier 120 is controlled by the controller 300, which may be a digital signal processor (DSP). The controller 300 allows an operator to control the amount of current supplied to the retarding system, and thus the amount of braking force produced. The amount of output from the rectifier 120 that is allowed by the controller 300 is sent to the electromagnetic retarder 200. The coil 340 that is located within the electromagnetic retarder 200 receives the DC from the rectifier 120. As current flows through the coil 340, a magnetic field is created. The magnetic field is carried in the magnetic conducting materials in a closed loop and magnetic flux is produced in the yoke 320. The yoke 320 is positioned only a slight air gap, radially, from the claw rotor 332, and the magnetic field jumps this air gap and travels into the claw rotor 332. The claw rotor 332 is polarized either North or South, dependent upon the direction of the DC current in the coil 340, while the claw rotor 334 is polarized the opposite. The claw rotors 332 and 334 are rotated together with the holder 350 by the shaft 20. Rotation of the polarized flux carrying claw rotor 332 produces a rotating magnetic field.

Figure 4:
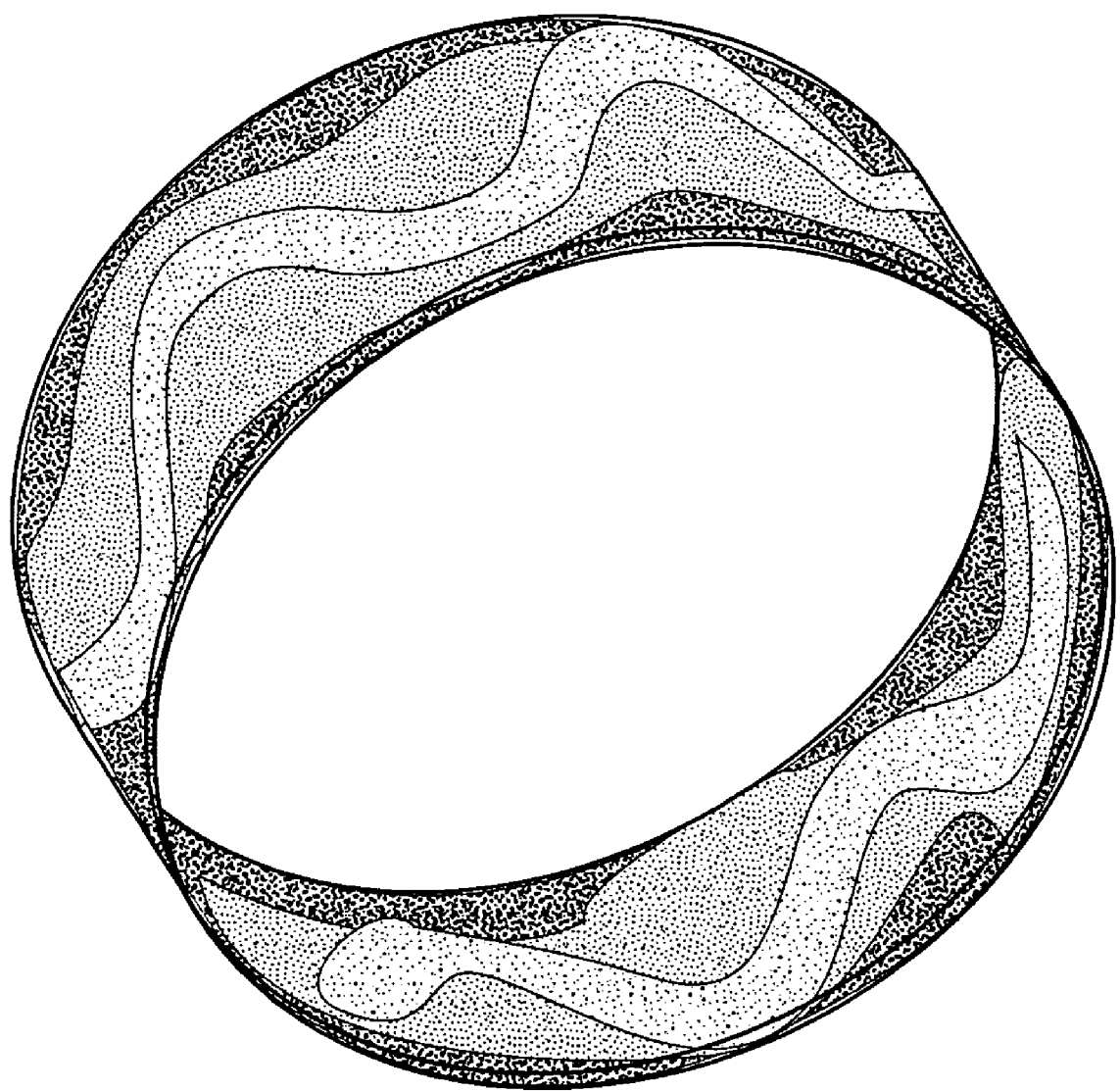
FIG. 4 is a computer generated image depicting the flux density in an induction drum in one embodiment of the present invention.
Figure 5:
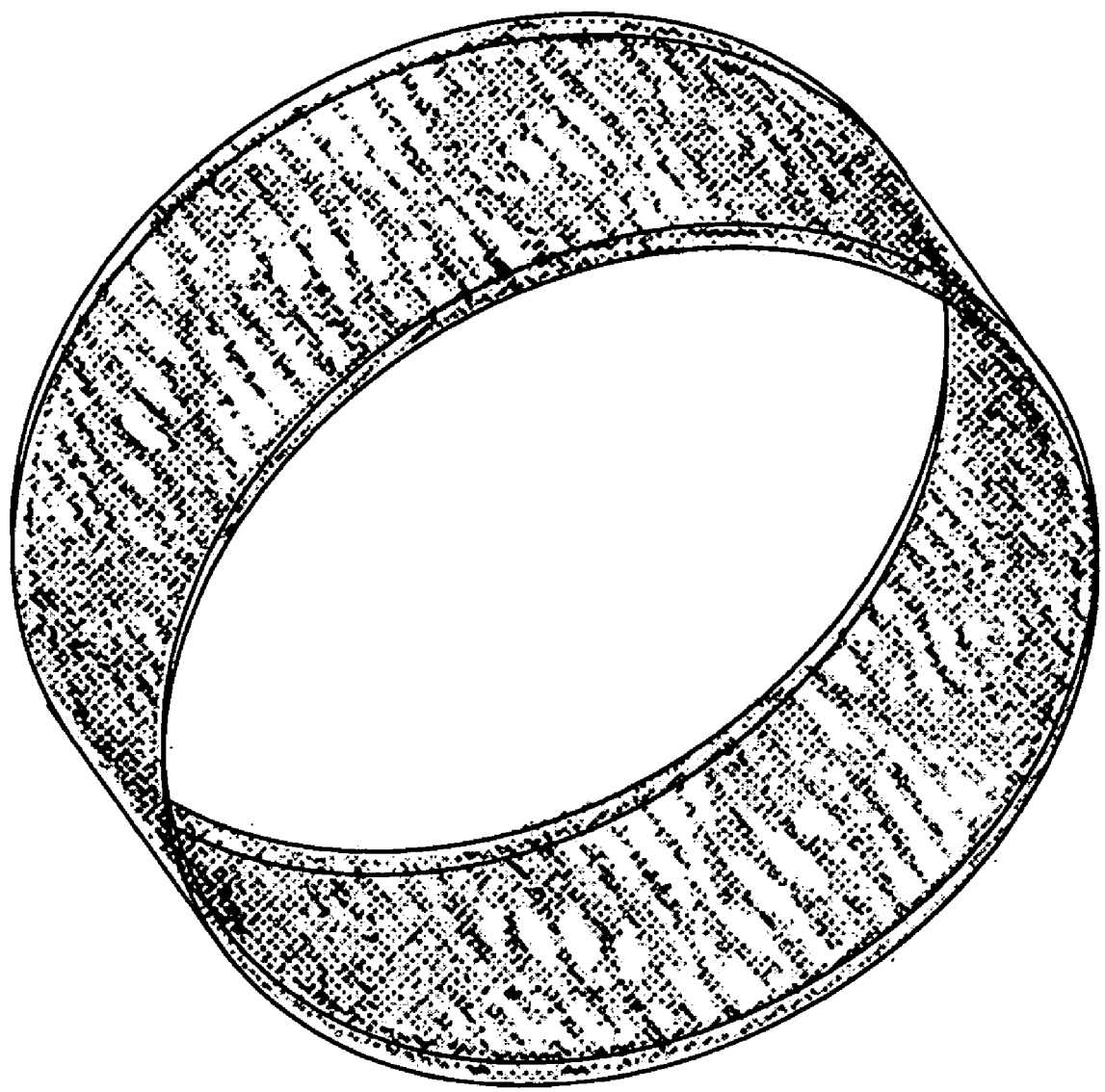
FIG. 5 is a computer generated image depicting the eddy current distribution in an induction drum in one embodiment of the present invention.

The flux jumps the main air gap from the claw rotor 332 to the induction drum 310. The flux density in the induction drum 310 according to one embodiment of the present invention is shown in FIG. 4. The relative movement between the induction drum 310 and the rotating claw rotors 332 and 334 causes eddy currents to be created in the induction drum 310. A computer generated image of the eddy currents in the induction drum 310 according to one embodiment of the present invention is shown in FIG. 5. It is to be understood that FIGS. 4 and 5 are for exemplary purposes only, and, as will be apparent to those of ordinary skill in the art, the actual values disclosed may vary depending on a variety of factors. Eddy currents oppose the movement that caused them, thereby opposing the movements of the claw rotors 332 and 334 and providing drag torque that retards the system. The flux then travels from the induction drum 310 to the claw rotor 334, polarized the opposite of claw rotor 332, thereby competing the flux loop.

Figure 6:
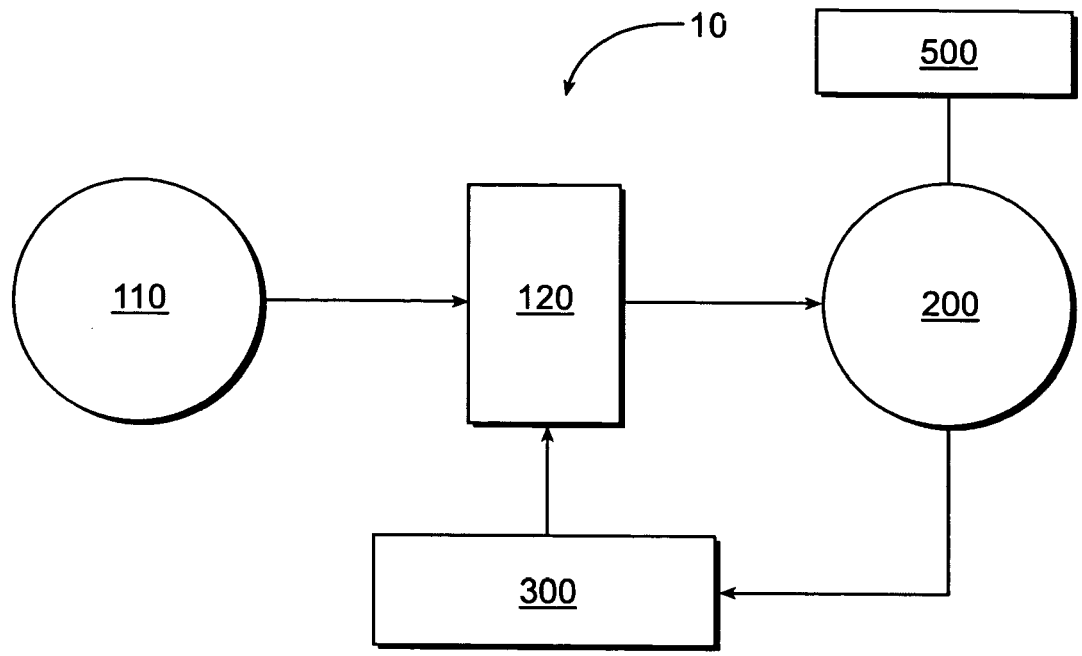
FIG. 6 is a block diagram of a retarder system according to a third embodiment of the present invention.

As shown in FIG. 6, in which like characters refer to like elements, the retarder system 10 may further comprise cooling means 500 connected to the retarder 200. Eddy currents found in the induction drum 310 dissipate the rotational energy of the system into heat, and as such cooling means may be required. In one embodiment, as shown in FIG. 3, the induction drum 310 is fluid cooled. A conduit 511 carries cool fluid from a cooling fluid supply source (not shown) to the induction drum 310. The cooling fluid runs through channels in the induction drum 310, absorbing excess heat before a conduit 512 returns the fluid to the cooling fluid supply source. Since the induction drum 310 is stationary, there are fewer problems associated with sealing the system than there are with a rotating drum system.

Figure 7:
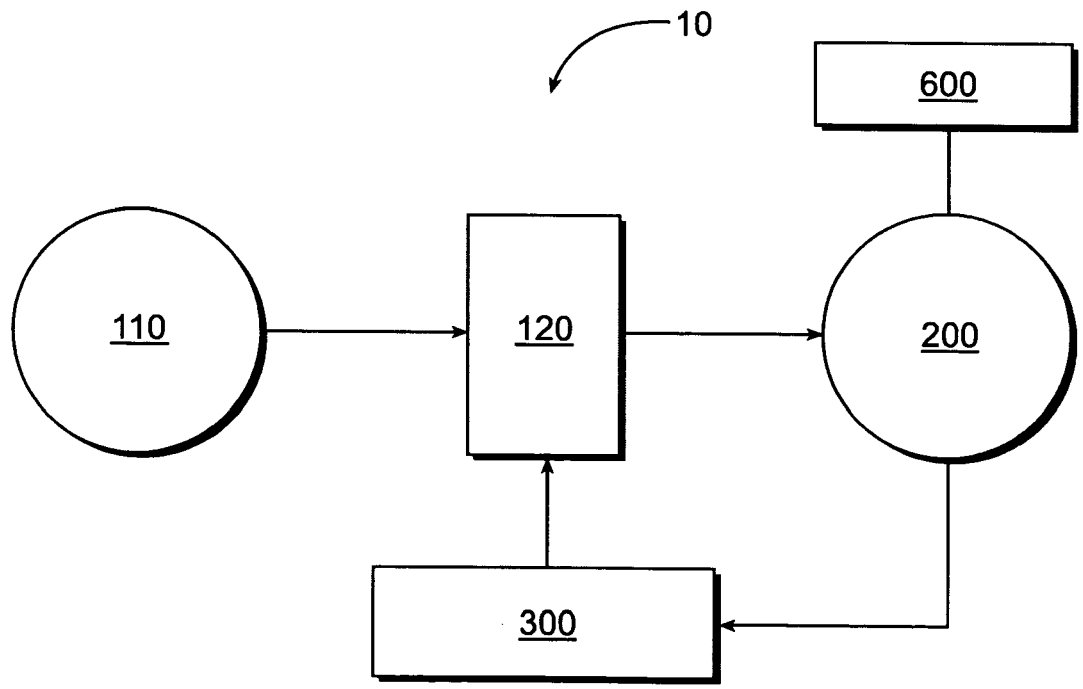
FIG. 7 is a block diagram of a retarder system according to a fourth embodiment of the present invention.

As shown in FIG. 7, a battery 600 may be electrically connected to the electromagnetic retarder 200 in one embodiment of the present invention. The electromagnetic retarder 200 may be used to generate electricity in the coil 340 by reversing the magnetic flux. In this manner, when a vehicle is under positive power and the electromagnetic retarder is not activated, the retarder system 10 may be run backwards in order to generate electricity. The generated electricity may be stored in the battery 600, and may be used to power a vehicle system or component.

It will be apparent to those skilled in the art that various modifications and variations can be made in the construction, configuration, and/or operation of the present invention without departing from the scope or spirit of the invention.

What is claimed is:

1. An electromagnetic retarding system for retarding a vehicle comprising:
   an alternator;
   a rectifier electrically connected to said alternator;
   a controller electrically connected to said rectifier, said controller adapted to control the output of said rectifier; and
   an electromagnetic retarder operatively connected to the rectifier.

2. The system of claim 1, wherein said electromagnetic retarder comprises a claw pole electromagnetic retarder.

3. The system of claim 1, wherein the electromagnetic retarder comprises:
   a shaft;
   a yoke connected to the shaft;
   a coil disposed around a portion of the yoke and electrically connected to the rectifier;
   a holder disposed around the coil;
   a rotor disposed around the holder; and
   an induction drum disposed around the rotor.

4. The system of claim 3, wherein the rotor is a claw pole rotor.

5. The system of claim 4, wherein the electromagnetic retarder comprises a second claw pole rotor disposed around the holder.

6. The system of claim 1, further comprising a fluid cooling system operatively connected to the electromagnetic retarder.

7. The system of claim 6, wherein said fluid cooling system comprises:
   a coolant supply source;
   a first conduit connecting said coolant supply source to said induction drum, said first conduit adapted to provide fluid flow from said coolant supply source to said induction drum; and
   a second conduit connecting said induction drum to said coolant supply source, said second conduit adapted to provide fluid flow from said induction drum to said coolant supply source.

8. The system of claim 3, further comprising:
   a coolant supply source;
   a first conduit connecting said coolant supply source to said induction drum, said first conduit adapted to provide fluid flow from said coolant supply source to said induction drum; and
   a second conduit connecting said induction drum to said coolant supply source, said second conduit adapted to provide fluid flow from said induction drum to said coolant supply source.

9. The system of claim 3, wherein the shaft, yoke, coil, holder, and rotor are connected such that they rotate together during operation of the electromagnetic retarder.

* * * * *